United States Patent
Yoshimura et al.

(10) Patent No.: US 12,546,016 B2
(45) Date of Patent: Feb. 10, 2026

(54) WATER ELECTROLYSIS CELL AND WATER ELECTROLYSIS STACK

(71) Applicant: TOYOTA JIDOSHA KABUSHIKI KAISHA, Toyota (JP)

(72) Inventors: Joji Yoshimura, Toyota (JP); Ryuichi Iwata, Nagakute (JP); Tsuyoshi Hamaguchi, Nagakute (JP); Tomoyuki Kayama, Nagakute (JP); Takahiro Ikeda, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 423 days.

(21) Appl. No.: 18/169,405

(22) Filed: Feb. 15, 2023

(65) Prior Publication Data
US 2023/0313388 A1    Oct. 5, 2023

(30) Foreign Application Priority Data
Mar. 29, 2022 (JP) .................. 2022-053730

(51) Int. Cl.
| | | |
|---|---|---|
| C25B 1/02 | (2006.01) |
| C25B 1/00 | (2021.01) |
| C25B 1/04 | (2021.01) |
| C25B 9/23 | (2021.01) |
| C25B 9/70 | (2021.01) |
| C25B 11/032 | (2021.01) |
| C25B 11/057 | (2021.01) |
| C25B 13/02 | (2006.01) |

(52) U.S. Cl.
CPC .................. *C25B 1/04* (2013.01); *C25B 9/23* (2021.01); *C25B 9/70* (2021.01); *C25B 11/032* (2021.01); *C25B 11/057* (2021.01); *C25B 13/02* (2013.01)

(58) Field of Classification Search
CPC ....... C25B 1/04; C25B 11/057; C25B 11/032; C25B 9/70; C25B 9/23; C25B 13/02
See application file for complete search history.

(56) References Cited

U.S. PATENT DOCUMENTS

| | | | | |
|---|---|---|---|---|
| 4,533,455 A | * | 8/1985 | Balko .................. | H01M 8/242 204/279 |
| 2007/0048590 A1 | | 3/2007 | Suh | |
| 2021/0143451 A1 | * | 5/2021 | Ishida ................ | H01M 8/1006 |
| 2021/0180196 A1 | * | 6/2021 | Schmid ................ | C25B 3/26 |
| 2021/0285427 A1 | | 9/2021 | Nakaue et al. | |
| 2022/0166041 A1 | * | 5/2022 | Mitsuta .................... | C25B 1/02 |

FOREIGN PATENT DOCUMENTS

| | | |
|---|---|---|
| DE | 112004002605 T5 | 11/2006 |
| DE | 112005002778 T5 | 8/2007 |
| DE | 202013003969 U1 | 8/2014 |

(Continued)

*Primary Examiner* — Zulmariam Mendez
(74) *Attorney, Agent, or Firm* — Hunton Andrews Kurth LLP

(57) ABSTRACT

A water electrolysis cell includes an anode disposed on one side across a solid polymer electrolyte membrane and a cathode disposed on another side. The anode is configured of an anode catalyst layer, an anode gas diffusion layer, and an anode separator, laminated in that order from a side of the solid polymer electrolyte membrane, a channel is provided in the anode separator, and the channel extends in a wave shape.

5 Claims, 4 Drawing Sheets

(56) References Cited

FOREIGN PATENT DOCUMENTS

| | | |
|---|---|---|
| DE | 102020215408 A1 | 6/2022 |
| JP | 2003147562 A | 5/2003 |
| JP | 2007066901 A | 3/2007 |
| JP | 2017186588 A | 10/2017 |
| JP | 2021161472 A | 10/2021 |
| WO | 2005069406 A2 | 7/2005 |
| WO | 2006055146 A2 | 5/2006 |
| WO | 2020129513 A1 | 6/2020 |

* cited by examiner

WATER ELECTROLYSIS CELL AND WATER ELECTROLYSIS STACK

CROSS-REFERENCE TO RELATED APPLICATION

This application claims priority to Japanese Patent Application No. 2022-053730 filed on Mar. 29, 2022, incorporated herein by reference in its entirety.

BACKGROUND

1. Technical Field

The present disclosure relates to a water electrolysis cell, and a water electrolysis stack, used in water electrolysis.

2. Description of Related Art

Japanese Unexamined Patent Application Publication No. 2003-147562 (JP 2003-147562 A), for example, discloses a stack structure in which water electrolysis cells, fastened by a plurality of screw shafts, are stacked in a lateral direction.

SUMMARY

In the related art, oxygen generated at an anode (oxygen generating electrode) is not discharged properly and is retained at the anode, and water for electrolysis is not readily supplied, leading to deterioration in electrolysis performance and durability.

The present disclosure provides a water electrolysis cell in which movement of generated gas is less likely to be inhibited by water, and deterioration in water electrolysis performance is suppressed.

One aspect of the present disclosure provides a water electrolysis cell. This water electrolysis cell includes an anode disposed on one side across a solid polymer electrolyte membrane and a cathode disposed on another side. The anode is configured of an anode catalyst layer, an anode gas diffusion layer, and an anode separator, laminated in that order from a side of the solid polymer electrolyte membrane, a channel is provided in the anode separator, and the channel extends in a wave shape.

In the water electrolysis cell according to the above aspect, an inner surface of the channel of the anode separator may be subjected to water repellency treatment.

In the water electrolysis cell according to the above aspect, a face of the anode gas diffusion layer that faces the anode separator may be subjected to hydrophilic treatment.

Another aspect of the present disclosure provides a water electrolysis stack. This water electrolysis stack includes the water electrolysis cells that are stacked. The water electrolysis cells are disposed in an orientation such that the channel extends in a vertical direction, and such that a lower part is a flow inlet, and an upper part is a flow outlet.

According to the present disclosure, deterioration of water electrolysis performance in a water electrolysis cell can be suppressed by keeping water from inhibiting movement of generated gas.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

1. Configuration of Water Electrolysis Cell

Figure 1:
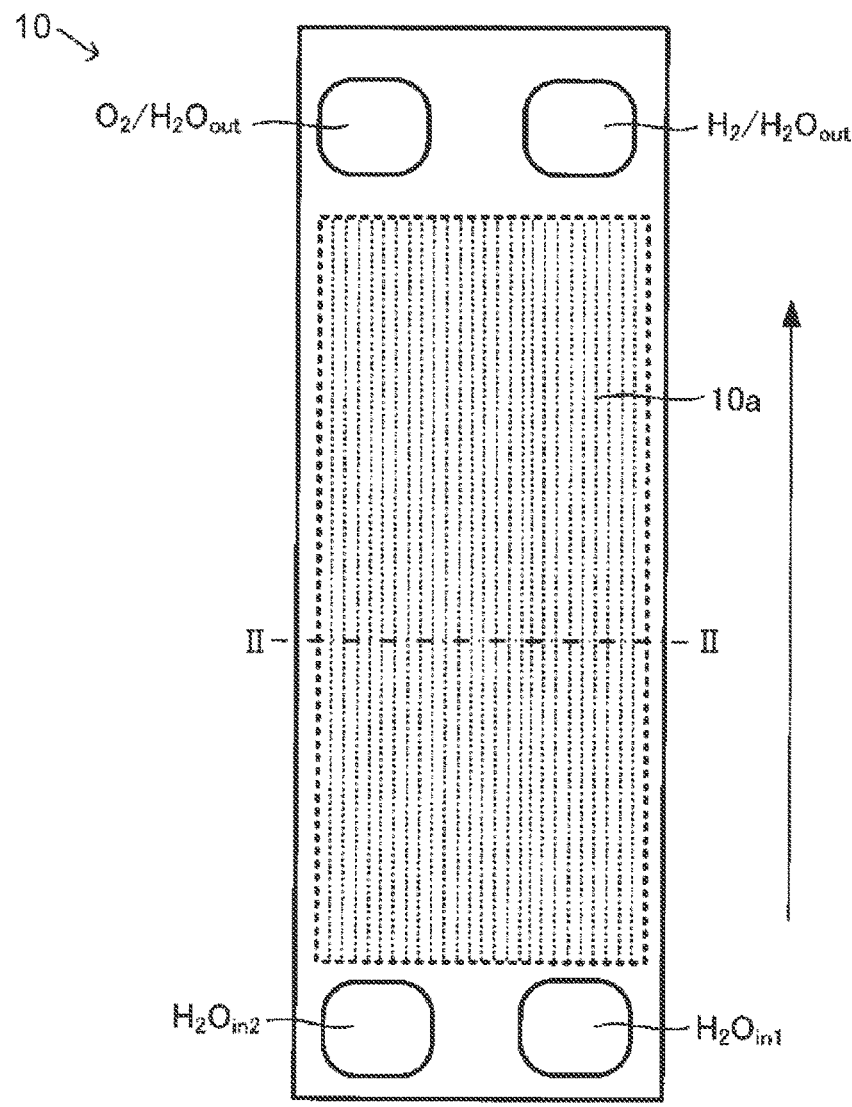
FIG. 1 is a diagram illustrating a water electrolysis cell 10 in plan view.
Figure 2:
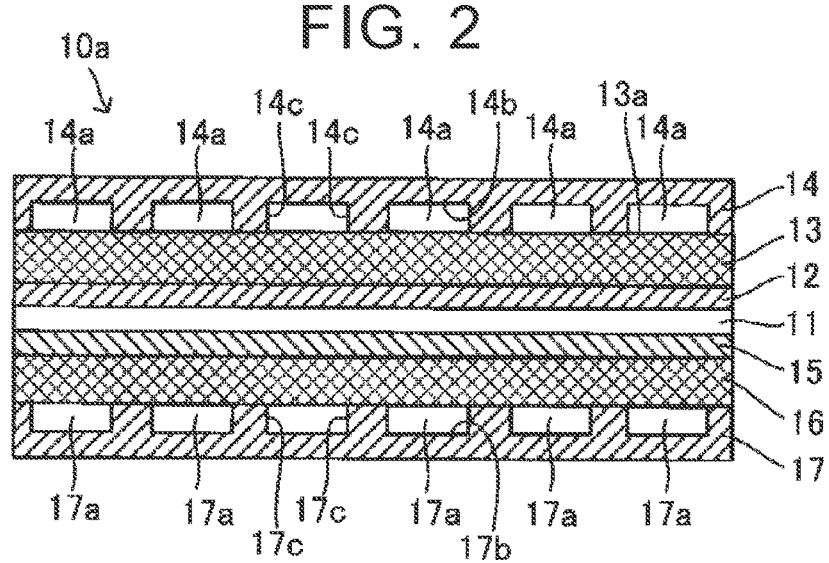
FIG. 2 is a conceptual diagram illustrating a layer configuration in a water electrolysis unit 10a of the water electrolysis cell 10.

FIGS. 1 and 2 are diagrams illustrating a water electrolysis cell 10 according to an embodiment. The water electrolysis cell 10 is a unit element for decomposing pure water into hydrogen and oxygen, and a plurality of such water electrolysis cells 10 is stacked to configure a water electrolysis stack. FIG. 1 is a diagram illustrating the water electrolysis cell 10 in plan view, and FIG. 2 is part of a section taken along line II-II in FIG. 1 and is a diagram illustrating a layer structure in a water electrolysis unit 10a that is a part of the water electrolysis cell 10 at which water electrolysis is performed.

The water electrolysis cell 10 is configured of a plurality of layers, one of which serves as an oxygen generating electrode (anode), and another serves as a hydrogen generating electrode (cathode), with a solid polymer electrolyte membrane 11 interposed therebetween. The anode includes an anode catalyst layer 12, an anode gas diffusion layer 13, and an anode separator 14, laminated in this order from the solid polymer electrolyte membrane 11 side. On the other hand, the cathode includes a cathode catalyst layer 15, a cathode gas diffusion layer 16, and a cathode separator 17, in this order from the solid polymer electrolyte membrane 11 side. Here, a water electrolysis membrane electrode assembly is a laminate of the solid polymer electrolyte membrane 11, the anode catalyst layer 12 disposed on the anode side of the solid polymer electrolyte membrane 11, and the cathode catalyst layer 15 disposed on the cathode side of the solid polymer electrolyte membrane 11. The thickness of the water electrolysis membrane electrode assembly typically is around 0.4 mm, and the thickness of the water electrolysis cell 10 at the water electrolysis unit 10a typically is around 1.3 mm. Each layer is as follows, for example.

1.1. Solid Polymer Electrolyte Membrane

The solid polymer electrolyte membrane 11 is one form of a membrane having proton conductivity. The material (electrolyte) that configures the solid polymer electrolyte membrane 11 in the present embodiment is a solid polymer material, examples of which include an ion exchange membrane that has proton conductivity and is configured of a fluororesin, a hydrocarbon resin material, and so forth. This exhibits good proton conductivity (electrical conductivity) under wet conditions. A more specific example is a membrane made of Nafion (registered trademark) that is a perfluoro-based electrolyte. The thickness of the solid polymer electrolyte membrane 11 is not limited in particular, but is no more than 100 preferably no more than 50 and even more preferably no more than 30

1.2. Anode Catalyst Layer

The anode catalyst layer (oxygen electrode catalyst layer) 12 is a layer having a catalyst containing at least one of noble metal catalysts such as platinum (Pt), ruthenium (Ru), iridium (Ir), and so forth, and oxides thereof. More specifically, examples of the catalyst include platinum, iridium oxides, ruthenium oxides, iridium ruthenium oxides, and mixtures thereof Examples of iridium oxides include iridium oxide ($IrO_2$, $IrO_3$), iridium tin oxides, iridium zirconium oxides, and so forth.

Examples of ruthenium oxides include ruthenium oxide ($RuO_2$, $Ru_2O_3$), ruthenium tantalum oxides, ruthenium zirconium oxides, ruthenium titanium oxides, ruthenium titanium cerium oxides, and so forth.

Examples of iridium ruthenium oxides include iridium ruthenium cobalt oxides, iridium ruthenium tin oxides, iridium ruthenium iron oxides, iridium ruthenium nickel oxides, and so forth.

The anode catalyst layer 12 here may contain an ionomer. Containing the ionomer enables coatability to be improved, and further the hydrophilicity of the ionomer can facilitate permeation of water supplied at the time of water decomposition. Examples of the ionomer contained therein include an ionomer containing a perfluoro-based electrolyte that is an electrolyte used in solid polymer electrolyte membranes.

1.3. Anode Gas Diffusion Layer

A known member can be used for the anode gas diffusion layer 13 that is configured of a member having gas permeability and electroconductivity. Specific examples include porous electroconductive members and so forth, made of sintered compacts of metal fibers (e.g., titanium fibers) or metal particles (titanium particles) or the like.

Furthermore, a face 13a of the anode gas diffusion layer 13 according to the present embodiment that faces a channel 14a of the anode separator 14 may be subjected to hydrophilic treatment. This facilitates collection of water on a surface of the anode gas diffusion layer 13, and smooth water decomposition can be realized since introduction of water into the anode gas diffusion layer 13 is facilitated by collecting and guiding water. The hydrophilicity preferably has a contact angle of no more than 50 degrees in a wettability test using deionized water.

Examples of hydrophilic treatment include ultraviolet (UV) light treatment, plasma treatment, and so forth, to impart hydrophilicity to the face 13a of the anode gas diffusion layer 13 itself, spraying inorganic compounds such as silica or hydrophilic resin on the face 13a, and so forth, thereby forming a hydrophilic layer.

Note however, while a layer of hydrophilic material may be formed as the hydrophilic treatment, this layer should not be formed on a face in contact with the anode separator 14. This is because the presence of hydrophilic material at the interface with the anode separator would form a resistor.

1.4. Anode Separator

The anode separator 14 is a member provided with the channels 14a through which pure water is supplied to the anode gas diffusion layer 13, and through which oxygen generated by decomposition of the water flows.

Figure 3:
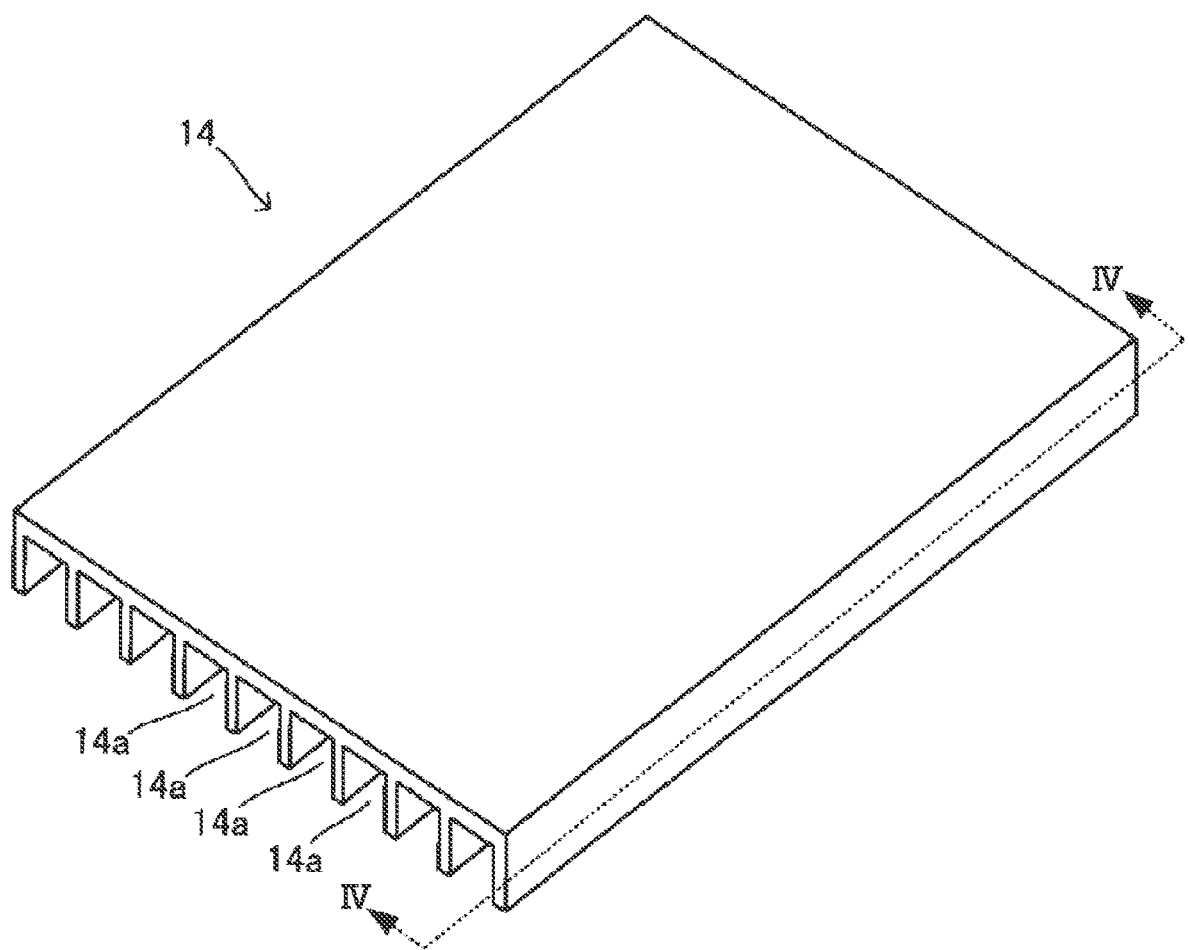
FIG. 3 is an external perspective view of a portion of an anode separator 14.
Figure 4:
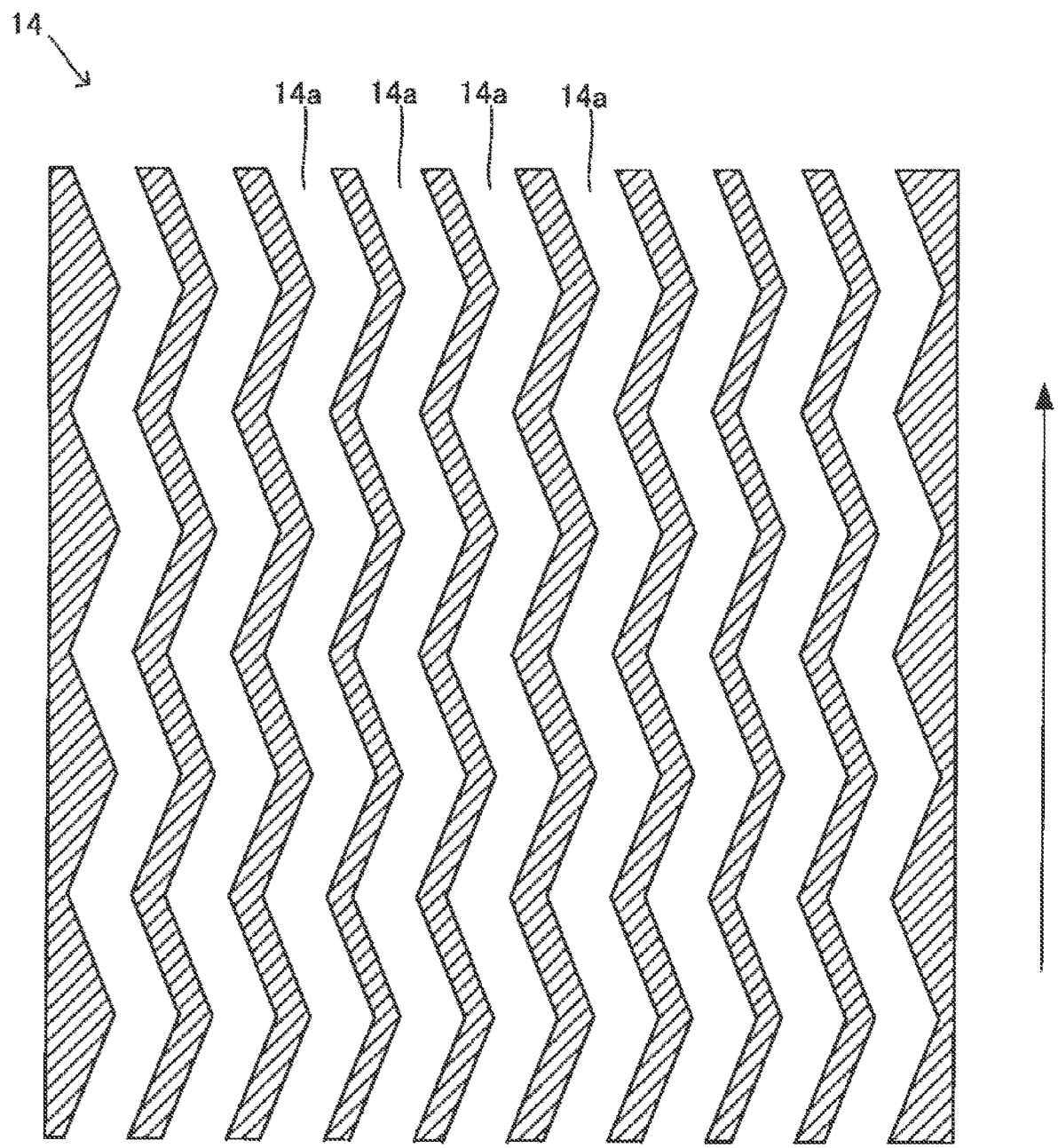
FIG. 4 is a sectional view of a portion of the anode separator 14.

FIGS. 3 and 4 are diagrams illustrating a configuration of the channels of the anode separator 14, in the water electrolysis unit 10a. FIGS. 3 and 4 are schematic diagrams conceptually illustrated for the purpose of description, and the actual object has a fine-pitched structure in which an even greater number of channels are disposed. FIG. 3 is an external perspective view of a part of the anode separator 14 disposed in the water electrolysis unit 10a, and FIG. 4 is a sectional view taken along line IV-IV in FIG. 3.

As can be seen from FIG. 4, the channels 14a of the anode separator 14 are formed having wave-like shapes. Accordingly, water flowing through the channels 14a can be made to be turbulent, and thus the water can be supplied to the anode gas diffusion layer 13 more readily. The shapes of the waves are not limited in particular, and may be triangular waves as illustrated in FIG. 4, sine waves, rectangular waves, or other irregular wave shapes. Further, the wave shapes preferably have a large amplitude and a short wavelength, within the range of capability of a liquid-conveying pump or the like, with respect to pressure loss when conveying water. More specifically, the amplitude is preferably twice or more the width of the channels (the size of the channels in the direction in which the plurality of channels is arrayed), and the wavelength is preferably 10 times the width of the channel or less.

In the present embodiment, inner faces of the channels 14a of the anode separator 14 that are bottom faces 14b and side faces 14c thereof (see FIG. 2) are subjected to water repellency treatment. This enables water to be repelled from the inner faces of the channels 14a, and guided to the anode gas diffusion layer 13. The degree of water repellency is not limited in particular, and having a sliding angle of no more than 70 degrees is sufficient, and preferably no more than 10 degrees, in a water repellency test using deionized water. The specific form of water-repellency treatment is not limited in particular, but can be performed by forming a water-repellent layer by spraying Teflon (registered trademark) or some other water-repellent material, or the like. In the present embodiment, the bottom faces 14b and the side faces 14c of the channels 14a are imparted with water repellency, but an arrangement may be made in which only the bottom faces 14b are imparted with water repellency.

As can be seen from FIG. 1, the anode separator 14 includes a water inlet port $H_2O_{in1}$ and a water inlet port $H_2O_{in2}$ provided at portions on one end side of the channels 14a, and a water and oxygen outlet port $O_2/H_2O_{out}$ and a water and hydrogen outlet port $H_2/H_2O_{out}$ provided at portions on the other end side of the channels 14a, at positions on outer sides of the water electrolysis unit 10a. The channels 14a here communicate with the water inlet port $H_2O_{in1}$ at the one end thereof, and with the water and oxygen outlet port $O_2/H_2O_{out}$ at the other end thereof 1.5. Cathode Catalyst Layer A known catalyst can be used as the catalyst contained in the cathode catalyst layer 15, and examples thereof include platinum, platinum-coated titanium, platinum-on-carbon, palladium-on-carbon, cobalt glyoxime, nickel glyoxime, and so forth. The cathode catalyst layer 15 here may contain an ionomer. Coatability can be improved by containing an ionomer. Examples of the ionomer contained therein include an ionomer made of a perfluoro-based electrolyte that is an electrolyte used in solid polymer electrolyte membranes.

1.6. Cathode Gas Diffusion Layer

A known member can be used for the cathode gas diffusion layer 16 that is configured of a member having gas permeability and electroconductivity. Specific examples include porous members such as carbon cloth, carbon paper, and so forth.

1.7. Cathode Separator

The cathode separator 17 is a member provided with channels 17a through which hydrogen generated by reduction of hydrogen ions, and water accompanying hydrogen ions permeating through the solid polymer electrolyte membrane 11 flow. Inner faces of the channels 17a that are bottom faces 17b and side faces 17c may be subjected to hydrophilic treatment. This enables water to be guided to the bottom faces 17b of the channels 17a, and due to the hydrogen being concentrated on the cathode gas diffusion layer 16 side of the channel 17a, outflow of hydrogen gas from the cathode gas diffusion layer 16 to the channels 17a is smoothly carried out. Although the degree of hydrophilicity is not limited in particular, a contact angle of no more than 50 degrees in a wettability test using deionized water is preferable.

Although hydrophilic treatment is not limited in particular, the inner faces of the channels 17a themselves may be imparted with hydrophilicity, through forming a hydrophilic layer by spraying or the like with silica or some other inorganic compound or hydrophilic resin, UV treatment, or plasma treatment. In the present embodiment, the bottom faces 17b and the side faces 17c of the channels 17a are imparted with hydrophilicity, but an arrangement may be made in which only the bottom faces 17b are imparted with hydrophilicity.

As can be seen from FIG. 1, the cathode separator 17 includes the water inlet port $H_2O_{in1}$ and the water inlet port $H_2O_{in2}$ provided at portions on one end side of the channels 17a, and the water and oxygen outlet port $O_2/H_2O_{out}$ and the water and hydrogen outlet port $H_2/H_2O_{out}$ provided at portions on the other end side of the channels 17a, at positions on the outer sides of the water electrolysis unit 10a. The channels 17a here communicate with the water inlet port $H_2O_{in2}$ at the one end thereof, and with the water and hydrogen outlet port $H_2/H_2O_{out}$ at the other end thereof 1.8. Hydrogen Generation by Water Electrolysis Cell The water electrolysis cell 10 described above generates hydrogen and oxygen from pure water as follows. Accordingly, the water electrolysis cells and the water electrolysis stack according to the present disclosure can include known members and configurations necessary for generating hydrogen, in addition to the above.

Pure water ($H_2O$) supplied from the channels 14a of the anode separator 14 to the anode (oxygen generating electrode) is decomposed into oxygen, electrons, and protons ($H^+$) in the anode catalyst layer 12 under potential, when current is applied across the anode and the cathode. At this time, the protons travel through the solid polymer electrolyte membrane 11 to the cathode catalyst layer 15. On the other hand, the electrons separated at the anode catalyst layer 12 reach the cathode catalyst layer 15 through an external circuit. The protons then receive the electrons at the cathode catalyst layer 15, thereby generating hydrogen ($H_2$). The generated hydrogen reaches the cathode separator 17 and is discharged through the channels 17a. Note that the oxygen generated at the anode catalyst layer 12 reaches the anode separator 14 and is discharged through the channels 14a.

2. Water Electrolysis Stack

Figure 5:
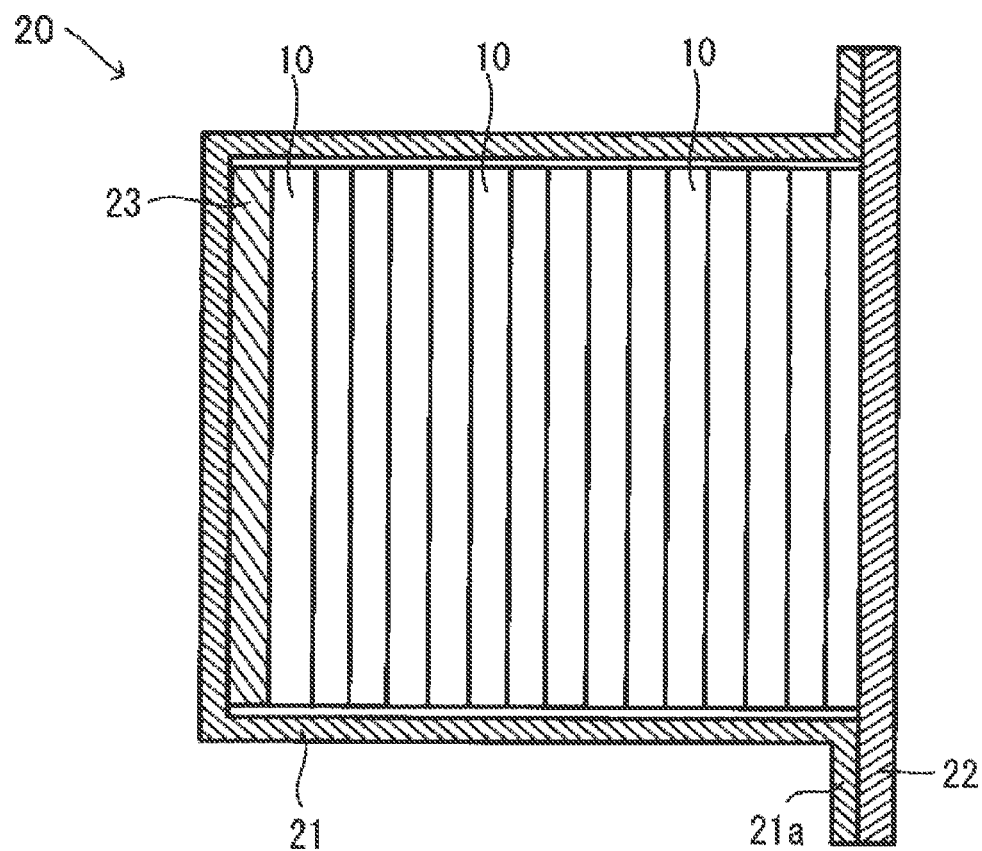
FIG. 5 is a diagram illustrating a structure of a water electrolysis stack 20.

A water electrolysis stack 20 is a member that is configured of a plurality (around 50 to 400) of the above-described water electrolysis cells 10 that is stacked up, and hydrogen and oxygen are generated by conducting electricity to the water electrolysis cells 10. FIG. 5 illustrates an overview of the configuration. The water electrolysis stack 20 includes a stack case 21, an end plate 22, the water electrolysis cells 10, and a biasing member 23.

The stack case 21 is a housing that accommodates the water electrolysis cells 10 that are stacked up, and the biasing member 23 therein. In the present embodiment, the stack case 21 is a square cylinder, open at one end and closed at the other, with a plate-like piece protruding from along edges of an opening thereof, away from the opening, thereby forming a flange 21a.

The end plate 22 is a plate-shaped member that closes off the opening of stack case 21. Portions of the end plate 22 that are overlaid by the flange 21a of the stack case 21 are fixed to the stack case 21 by bolts, nuts, or the like, so as to cover the stack case 21.

The water electrolysis cells 10 are as described above. Multiple such water electrolysis cells 10 are stacked up. It can be seen from FIG. 5 that in the present embodiment, the water electrolysis cells 10 are configured to be stacked in a lateral direction. In each water electrolysis cell 10, water is supplied to the anode separator 14 from the water inlet port $H_2O_{in1}$ below, as illustrated in FIG. 1, water and generated oxygen flow upward from below as indicated by straight arrows in FIGS. 1 and 4, and are discharged from the water and oxygen outlet port $O_2/H_2O_{out}$ illustrated in FIG. 1.

The biasing member 23 fits inside the stack case 21, and exerts a pressing force on the stack of the water electrolysis cells 10 in the direction of stacking thereof Examples of members that can be used as the biasing member include a disc spring and the like.

3. Effects, Etc.

Hydrogen and oxygen are generated by the water electrolysis cells 10 as described above, and the water for electrolysis supplied to the anode separator 14 collides with the walls of the channels 14a when flowing through the channels 14a, and becomes turbulent. The water for electrolysis thus flows more readily so as to be supplied to the anode gas diffusion layer 13, and the generated oxygen also moves without being retained and accordingly is smoothly discharged. Accordingly, electrolysis performance is improved and drying of the solid polymer electrolyte membrane 11 can also be averted, thereby improving durability.

In particular, when the water electrolysis cells 10 are disposed in the water electrolysis stack 20 as described above, and water is supplied from below and directed upward, the water tends to accumulate at lower portions due to the effects of gravity, resulting in poor electrolysis performance, but the above effects of the channels 14a can suppress deterioration in electrolysis performance, as described in the present disclosure.

What is claimed is:

1. A water electrolysis cell comprising an anode disposed on one side across a solid polymer electrolyte membrane and a cathode disposed on another side, wherein:

the anode is configured of an anode catalyst layer, an anode gas diffusion layer, and an anode separator, laminated in that order from a side of the solid polymer electrolyte membrane; and a channel is provided in the anode separator, and the channel extends in a wave shape selected from triangular waves and rectangular waves, the wave shape makes water flowing through the channel turbulent by causing the water to collide with walls of the first channel, and an amplitude of the wave shape is twice a width of the channel and a wavelength of the wave shape is 10 times the width of the channel, wherein the water electrolysis cell is disposed in an orientation such that the channel extends in a vertical direction, and such that a lower part is a flow inlet, and an upper part is a flow outlet, the channel is a first channel, the cathode comprises a cathode separator, a second channel is provided in the cathode separator, the water electrolysis cell is disposed in an orientation such that the second channel extends in the vertical direction, and such that a lower part of the second channel is a second flow inlet, an upper part of the second channel is a second flow outlet, wherein water is supplied from below and flows upward through the channel in the vertical direction, and wherein hydrogen is generated by reduction of hydrogen ions and water flow through the second channel.

2. The water electrolysis cell according to claim 1, wherein an inner surface of the channel of the anode separator is subjected to water repellency treatment.

3. The water electrolysis cell according to claim 1, wherein a face of the anode gas diffusion layer that faces the anode separator is subjected to hydrophilic treatment.

4. A water electrolysis stack comprising a plurality of the water electrolysis cells according to claim 1 that are stacked.

5. A water electrolysis cell comprising an anode disposed on one side across a solid polymer electrolyte membrane and a cathode disposed on another side, wherein:

the anode is configured of an anode catalyst layer, an anode gas diffusion layer, and an anode separator, laminated in that order from a side of the solid polymer electrolyte membrane; and a first channel is provided in the anode separator, and the first channel extends in a wave shape selected from triangular waves and rectangular waves, the wave shape makes water flowing through the first channel turbulent by causing the water to collide with walls of the first channel, and an amplitude of the wave shape is twice a width of the first channel and a wavelength of the wave shape is 10 times the width of the first channel, wherein the water electrolysis cells are disposed in an orientation such that the first channel extends in a vertical direction, and such that a lower part is a flow inlet, and an upper part is a flow outlet, the cathode comprises a cathode separator, a second channel is provided in the cathode separator, the water electrolysis cells are disposed in an orientation such that the second channel extends in the vertical direction, and such that a lower part of the second channel is a second flow inlet, and an upper part of the second channel is a second flow outlet, wherein water is supplied from below and flows upward through the channel in the vertical direction, and wherein hydrogen is generated by reduction of hydrogen ions and water flow through the second channel.

* * * * *